United States Patent
Frankenberger et al.

(10) Patent No.: US 9,121,933 B2
(45) Date of Patent: Sep. 1, 2015

(54) COMPUTING OF ROBUST AND IMPROVED SIGNAL-IN-SPACE ACCURACY PARAMETERS IN A REGIONAL OR GLOBAL NAVIGATION SATELLITE SYSTEM

(75) Inventors: Harald Frankenberger, Ottobrunn (DE); Michael Kirchner, Munich (DE)

(73) Assignee: ASTRIUM GMBH, Taufkirchen (DE)

( * ) Notice: Subject to any disclaimer, the term of this patent is extended or adjusted under 35 U.S.C. 154(b) by 540 days.

(21) Appl. No.: 13/206,031

(22) Filed: Aug. 9, 2011

(65) Prior Publication Data

US 2012/0038511 A1    Feb. 16, 2012

(51) Int. Cl.
G01S 19/08    (2010.01)

(52) U.S. Cl.
CPC .................................... *G01S 19/08* (2013.01)

(58) Field of Classification Search
USPC ............... 342/357.4, 357.46, 357.58, 357.77; 701/468, 469
See application file for complete search history.

(56) References Cited

U.S. PATENT DOCUMENTS

| 2007/0222669 | A1  | 9/2007 | Trautenberg |           |
|--------------|-----|--------|-------------|-----------|
| 2010/0052979 | A1* | 3/2010 | Trautenberg | 342/357.02 |
| 2010/0079340 | A1* | 4/2010 | Oehler      | 342/357.12 |

FOREIGN PATENT DOCUMENTS

| EP | 1832891     | 9/2007  |
|----|-------------|---------|
| EP | 2159591     | 3/2010  |
| JP | 9-73438     | 3/1997  |
| JP | 2004-78981  | 3/2004  |
| JP | 2004-325440 | 11/2004 |
| JP | 2008-513748 | 5/2008  |
| JP | 2008-309522 | 12/2008 |
| JP | 2009-116541 | 5/2009  |
| JP | 2010-134632 | 6/2010  |
| WO | 2006/032422 | 3/2006  |
| WO | 2009/049263 | 4/2009  |

OTHER PUBLICATIONS

Werner et al., "Galileo Integrity Performance Assessment Results and Recommendations," ION GPS 2002:15th International Technical Meeting of the Satellite Division of the Institute of Navigation, Portland, OR, Sep. 24-27, 2002.
Silverman B W, "Density Estimation for Statistics and Data Analysis", Internet Citation, XP007916577 , Jan. 1, 1986, pp. 1-22.
Aiden Deem et al., "A Simultation Study for 1, 11-14 a Galileo External Regional Intergrity System Configured for the Australasian Region", Proceedings of IGNSS Symposium 2007, Sydney, Australia , Dec. 4, 2007, pp. 1-13.

(Continued)

*Primary Examiner* — Dao Phan
(74) *Attorney, Agent, or Firm* — Greenblum & Bernstein, P.L.C.

(57) ABSTRACT

Method, computer program to implement method, storage medium to store the program and apparatus for computing Signal-in-Space Accuracy (SISA) parameters in a regional or Global Navigation Satellite System (GNSS). The method includes at least of: determining individual Signal-in-Space Error (SISE) vectors; mapping individual SISE vectors to a service area; accumulating empirical sample sets; processing density functions of estimations of accumulated sample sets; individually overbounding density functions in one of an overbounding sense related to the regional or GNSS or in a paired overbounding with excess mass sense; and selecting a worst case according to predefined requirements.

20 Claims, 2 Drawing Sheets

(56) References Cited

OTHER PUBLICATIONS

Jason Rife et al., "Paired overbounding for nonideal LASS and WAAS error distributions ", IEEE Transactions on Aerospace and Electronic Systems, IEEE Service Center, Piscataway, NJ, US, vol. 42, No. 4, XP01116806, Oct. 1, 2006, pp. 1386-1395.

Blomenhofer H et al., "Sensitivity Analysis of the Galileo Integrity performance dependent on the Ground Sensor Station Network", Proceedings of Ion GNSS 2005, Long Beach, CA, USA, XP002559024, Sep. 13, 2005, pp. 1361-1373.

Medel C H et al., "SISA Computation Algorithms and their applicability for Galileo Intergity", Proceedings of the Institute of Navigation (ION) GPS, XX, XX, XP002316876, Sep. 24, 2002, pp. 2173-2184.

Shaojun Feng et al., "An Efficient Worst User Location Algorithm for the Generation of the Galileo Integrity Flag", Proceedings of the 18th International Technical Meeting of the Satellite Division of the Institute of Navigation (Ion GNSS 2005), XP007916805, Sep. 13, 2005, pp. 2374-2384.

Silva P F et al., "Multi-system Integrity Algorithms", 20080916, XP007919168 , Sep. 16, 2008, pp. 132-138.

Turlach B, "Bandwidth Selection in Kernel density Estimation: GBP A Review ", Statistic Und Oekonometrie, Humboldt Universitaet Berlin, DE, No. 9307, XP007916697, Jan. 1, 1993, pp. 1-33.

Search report from E.P.O. in counterpart European Patent Application No. 10008313.8 dated Sep. 8, 2011.

Search report from E.P.O. in counterpart European Patent Application No. 10008313.8, dated Jan. 27, 2011.

English language translation of Japanese Office Action conducted in counterpart Japanese Appln. No. 2011-173748 (May 14. 2013).

* cited by examiner

COMPUTING OF ROBUST AND IMPROVED SIGNAL-IN-SPACE ACCURACY PARAMETERS IN A REGIONAL OR GLOBAL NAVIGATION SATELLITE SYSTEM

CROSS-REFERENCE TO RELATED APPLICATIONS

The present application claims priority under 35 U.S.C. §119(a) of European Patent Application No. EP 100 08 313 filed Aug. 10, 2010, the disclosure of which is expressly incorporated by reference herein in its entirety.

BACKGROUND OF THE INVENTION

1. Field of the Invention

The invention relates to a method for computing robust and improved Signal-in-Space Accuracy (SISA) parameters in a Regional or Global Navigation Satellite System (GNSS).

2. Discussion of Background Information

Satellite systems for global navigation allow to accurately determining the position on Earth or in the air. GNSS, such as for example the actually constructed European satellite navigation system, better known under the name "Galileo," comprise a plurality of satellites and a control system.

The accuracy of a GNSS depends on several parameters, one of which is the quality of the knowledge of the orbit of each satellite and the time error of the satellite clocks with respect to the system time. This quality is expressed by the Signal-in-Space Accuracy (SISA). While this description refers to the term SISA used in the frame of Galileo GNSS the invention is not limited to this system and the term is rather understood to be general. In particular the corresponding parameter for the NAVSTAR-GPS GNSS is referred to as User Range Error (URE). Further, additional background regarding SISA can be found in the article by Medel et al., "SISA Computation Algorithms and their applicability for Galileo Integrity," *Proceedings of the 15th International Technical Meeting of the Satellite Division of The Institute of Navigation* (ION GPS 2002), and additional information regarding Galileo can be found in the article by Werner et al., "GALILEO: Integrity Performance Assessment Results And Recommendations," *ION GPS* 2002: 15*th International Technical Meeting of the Satellite Division of The Institute of Navigation*; Portland, Oreg.; USA; 24-27 Sep. 2002, the disclosures of which are expressly incorporated by reference herein in their entireties.

SISA is the leading parameter describing the actual quality of the navigation signals of the GNSS and is broadcast regularly by the GNSS. A safe value as small as possible with a high confidence is essential for all navigation services as user trust this parameter in a way that navigation decisions—partly even for critical operations—are based on this. A high confidence must thus be ensured for this parameter.

The classical SISA computation developed in the frame of Galileo project consists of two steps: (1) determination of Signal-in-Space Error (SISE) samples; and (2) overbounding of the resulting distribution.

However, this computation method suffers of some drawbacks:
- the determination of errors is very conservative;
- due to the determination procedure there are singularities (bi-modality) in the underlying probability density which prevent proper overbounding;
- overbounding results are highly sensitive to the applied configuration parameters which are selected either manually or by improper methods.

It is very likely that due to the identified weaknesses it is not possible to reach the required confidence at the end.

SUMMARY OF INVENTION

Therefore, embodiments of the invention provide a computation of SISA parameters in a robust sense simultaneously performing better than the classical approach.

The SISA computation method according to the invention may include one or more of the following three steps of which individual steps are already suited to overcome the major limitations: (1) determination of the underlying SISE samples with an adapted method which is less conservative and leading to an error distribution without singularities; (2) estimation of density functions for the underlying SISE density by a non-parametric approach using data-driven (automatic) selection of configuration parameters (bandwidth); and (3) overbounding of the function either in the Galileo sense or in the paired overbounding with excess mass sense.

Step (1) of the method leads to more realistic error distributions (unimodal) allowing to explore respective performance margins while conservativeness can still be ensured. The performance margin which is made accessible by this can be up to 5-10%.

Step (2) is a density estimation strategy robust against singularities in the underlying distribution. Therefore Step (2) could also be applied to the distributions generated with the classical approach. Furthermore, results of Step (2) are not dependent of any configuration parameters. Therefore, no weakly justified assumptions are necessary.

Step (3) is the correct numerical application of the overbounding definition to the estimated density. This is not the case for the classical approach. Therefore the confidence of the results of the proposed strategy can be ensured. Within Step (2) dedicated dependencies of the underlying data may be handled by nature of the bandwidth selectors while the classical approach applies a rule of thumb method to deal with this.

It should be noted that the invention relates to a technical process, as expressed by the tem "computation". The technical process of the invention processes intermediate results of the orbit determination and time synchronization element of the GNSS and computes SISA parameters from these results, which may be used by GNSS receivers and positioning devices to assess the integrity risk in a GNSS with a high accuracy.

An embodiment of the invention relates to a method for computing robust and improved Signal-in-Space Accuracy parameters in a Regional or Global Navigation Satellite System comprising at least one the following:
- determining individual Signal-in-Space Error vectors;
- mapping the individual Signal-in-Space Error vectors to a service area;
- accumulating empirical sample sets;
- processing density functions of estimations of accumulated sample sets;
- individually overbounding the density functions in the Galileo overbounding sense or in the sense of paired overbounding with excess mass; and
- selecting a worst case according to predefined requirements.

A further embodiment of the invention relates to a computer program, which implements a method according to the invention and as described above and enabling the computing of robust and improved Signal-in-Space Accuracy parameters in a Regional or Global Navigation Satellite System when executed by a computer. The computer program may be for example installed on a computing device within the control segment of a GNSS, for example the control segment of NAVSTAR-GPS or the upcoming European GNSS GALILEO.

According to a further embodiment of the invention, a record carrier storing a computer program according to the invention may be provided, for example a CD-ROM, a DVD, a memory card, a diskette, or a similar data carrier suitable to store the computer program for electronic access.

A yet further embodiment of the invention provides an apparatus for computing robust and improved Signal-in-Space Accuracy parameters in a Regional or Global Navigation Satellite System according to a method of the invention and for providing the computed Signal-in-Space Accuracy parameters for further use in the Regional or Global Navigation Satellite System. The apparatus may for example include a memory storing a computer program implementing the method of the invention and a processor, which is enabled by executing the stored computer program to compute from results of the orbit determination and time synchronization processing of the control segment of GNSS SISA parameters in a robust sense simultaneously performing better than the classical approach. The apparatus may be for example applied in the control system of a GNSS, such as the control segment of GALILEO.

These and other aspects of the invention will be apparent from and elucidated with reference to the embodiments described hereinafter.

Embodiments of the present invention are directed to a method for computing Signal-in-Space Accuracy (SISA) parameters in a regional or Global Navigation Satellite System (GNSS). The method includes at least of: determining individual Signal-in-Space Error (SISE) vectors; mapping individual SISE vectors to a service area; accumulating empirical sample sets; processing density functions of estimations of accumulated sample sets; individually overbounding density functions in one of an overbounding sense related to the regional or GNSS or in a paired overbounding with excess mass sense; and selecting a worst case according to predefined requirements.

According to embodiments, the mapping of the individual SISE vectors to the service area can include projecting a 4 dimensional individual SISE vector to a finite number of dedicated directions pointing into the service area such that the service area is covered sufficiently. The projecting may utilize a reference frame that is formed by one of: a satellite fixed reference, so that the reference frame is as seen from the navigation satellite antenna and which is fixed to the satellite; a first orbit fixed reference frame defined by a "satellite-Earth" vector, an orthogonal projection of an "in flight direction" vector of the satellite that is perpendicular to "satellite-Earth" vector, and a "cross flight direction" vector that is perpendicular to the "satellite-Earth" and "in flight direction" vectors; and a second orbit fixed reference frame defined by the "in flight direction" vector, an orthogonal projection of the "satellite-Earth" vector that is perpendicular to the "in flight direction" vector, and the "cross flight direction" vector that is to the "satellite-Earth" and "in flight direction" vectors.

In accordance with other embodiments of the invention, the accumulating of empirical sample sets can include one of: accumulating per direction, and per satellite if several satellites are involved, accumulating per dedicated conditions; and when more the satellite system comprises more than one satellite, accumulating per direction and per satellite. Further, the dedicated conditions may include eclipse condition of satellite, clock type, signal type, or satellite (build) groupings. Also, the accumulating empirical sample sets further can include, for paired overbounding with excess mass, widening of projected errors by: estimating a mean for each set of accumulated samples; subtracting a dedicated amount, reflecting a small deterministic error, from all samples of the set which are essentially smaller than the estimated mean; and adding a same amount to all samples of the set which are essentially greater than the estimated mean. Still further, the accumulating empirical sample sets can further include, for overbounding related to the relative or GNSS, widening projected errors by: estimating a mean for each set of accumulated samples; calculating a SISA parameter for the samples of the set; subtracting a dedicated amount, reflecting a small deterministic error, from all samples of the set, and then calculating the SISA parameter to identify a worst case calculated SISA parameter and the calculated SISA parameter preceding the identified worst case calculated SISA parameter; and adding a same amount to all samples of an original set, and then calculating the SISA parameter to identify a worst case calculated SISA parameter and the calculated SISA parameter preceding the identified worst case calculated SISA parameter.

According to still other embodiments of the instant invention, the processing density functions of estimations of accumulated sample sets may include deriving an estimation of the probability density of a corresponding underlying random variable by applying one of a kernel density estimator or an adaptive kernel density estimator method. A kernel k can be selected from the group of Epanechnikov, Biweight (Quartic), Triweight, Gaussian, and Cosine kernels. Further, kernel k may be selected from the group cardinal B-splines of any order and re-centered to zero. The cardinal B-splines can have an order of one of 3 or 4. Also, a bandwidth h can be derived automatically via optimality criteria selected from the group of: a cross-validation based on minimizing the integrated squared error (ISE); a mean integrated squared error (MISE), or plug-in methods based on minimizing the asymptotic mean integrated squared errors (AMISE); a least squares cross-validation that includes minimizing ISE; a bandwidth factorized smoothed cross-validation that includes minimizing MISE; and at least one of a Park & Marron Plug-In and the Sheather & Jones Plug-In, which are based on AMISE. The individually overbounding in the overbounding sense related to the regional or GNSS can include approximating a SISA parameter using the equation:

$$SISA = \frac{1}{\sqrt{2}} sup_{L>0} \frac{L}{\text{erf}^{-1}\left(\int_{-L}^{L} p(t)dt\right)}. \quad (1)$$

In this regard, f can be a kernel density estimator for the unknown probability density p, and an interval [0, L_0] can be discretized, where L_0 is any number such that the integral $\int_{-L}^{L} p(t)dt$ is numerically one, and a corresponding maximal value of the quotient expressing SISA in equation (1) can be sought.

Embodiments of the invention are directed to a computer program stored on a tangible storage medium that is executable by a processor to implement the above-described embodiment of the method.

Embodiments of the invention are directed to a tangible storage medium that includes the above-described computer program.

Embodiments of the instant invention are directed to an apparatus for computing Signal-in-Space Accuracy (SISA) parameters for a navigation system according to the above-described embodiment of the method. The apparatus includes a navigation system comprising a navigation signal generator; an individual Signal-in-Space Error (SISE) vector determininer associated with the navigation signal generator; an individual SISE vectors to a service area mapper associated with the navigation signal generator; empirical sample sets accumulator for each clock/position signal generator in the navigation system; a calculator structured to calculate density functions of estimations of the accumulated sample sets; a device structured to individually overbound density functions in one of an overbounding sense related to the navigation system or in a paired overbounding with excess mass sense; and a worst case selector structured to identify and select a worst case condition based upon predefined requirements.

In accordance with embodiments, the navigation system can include a regional or Global Navigation Satellite System (GNSS).

According to other embodiments, the navigation system may not be a satellite-based.

In accordance with still other embodiments, the navigation signals may include at least one of position and clock data.

Embodiments of the invention are directed to a method for computing Signal-in-Space Accuracy (SISA) parameters in a regional or Global Navigation Satellite System (GNSS). The method includes determining individual Signal-in-Space Error (SISE) vectors; mapping the individual SISE vectors to a service area; accumulating empirical sample set according to direction; processing density functions of estimations of the accumulated sample sets; individually overbounding density functions in one of an overbounding sense related to the regional or GNSS or in a paired overbounding with excess mass sense; and selecting a worst case direction.

In accordance with still yet other embodiments of the present invention, the method can include broadcasting the SISA parameter in the regional or GNSS.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DESCRIPTION OF EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The classical technical method for the determination of the SISA parameter is a multi-step approach. While the details differ among the different strategies all of them typically comprise the following high level steps:

Extraction of satellite position and satellite clock error parameters out of a prediction made for providing the navigation service with parameters to be broadcast via the signal in space.

Extraction of satellite position and satellite clock error parameters out of a precise solution (typically a post-processed adjustment).

Identification of common epochs of interest and determination of difference in predicted and precise orbit position and satellite clock error, i.e. the orbit position error and the clock error due to prediction as a 4 dimensional error vector.

Via a strategy dependent mapping the error is transformed to an error as seen by the user. This gives one sample of the SISE.

Accumulation of many of such epochs to build empirical time series of SISE, which are assumed to be realizations of single statistical processes, i.e. of single random variables.

Estimation of the density of the underlying random variables with a strategy dependent method.

In the case of Galileo: overbounding in the probability sense to characterize the estimated density by a Gaussian distribution.

The following particularities exist in background art:

1) To determine the error as seen by the user the 4 dimensional error (3 orbital directions and clock error) is projected to the service area in a way to derive the worst impact for the particular epoch (so called Worst User Location approach). When accumulating all such errors this leads to a very conservative situation since the location impacted worst is driving the error and hence the accumulated error distribution. This conservativeness is a major drawback in background art.

2) Due to a very limited compensation of orbital and clock errors in the case of the Worst User Location approach zero errors are hardly obtained which leads to a gap in the probability density of the error distribution around zero. This gap (or bi-modularity) can be understood as a singularity in the error distribution. As this singularity does not represent a realistic case and requires some special treatments (to be described below) it is considered a further major drawback in background art.

3) The method for density estimation is based on a simple histogram based approach requiring configuration parameters which are manually set. In this way, they are very hard to set but have a large impact to the final result. This is a further drawback of prior art as it makes it hardly possible to provide evidence for the required confidence of the result.

4) The overbounding strategy is strongly linked to the density estimation. Due to the singularity in the distribution the method requires a work-around as it would fail otherwise. The work-around is based on rejection of the inner part of the distribution. As the rejection thresholds are derived from the distribution assuming Gaussianity which is obviously wrong it is considered a further drawback of background art.

It is very likely that due to the identified drawbacks it is not possible to reach the required confidence of the SISA parameter at the end.

Therefore, the present invention proposes a modified method for the computation of SISA parameters which overcomes the limitations identified in background art.

The modified SISA computation method according to the invention comprises four steps. Some of the individual steps are already by itself suited to overcome the major limitations of prior art:

(1) Determination of the underlying SISE samples with an adapted method which is less conservative and leading to an error distribution without singularities, i.e. to a unimodal probability density.

(2) Discretising the directions starting at the satellite and lying in the cone given by the satellite and the service area. Accumulation of projected error samples per such direction and per satellite and, maybe, by other classification methods.

(3) Estimation of density functions for the underlying SISE random variables by a non-parametric approach using data-driven (automatic) selectors for the essential configuration parameter (so-called bandwidth).

(4) Overbounding of the function either in the Galileo sense or in another embodiment in the sense of paired overbounding with excess mass.

While an embodiment of the modified SISA computation is intended to be applied to real data striving in obtaining empirical distributions of error quantities to provide the respective evidence for the navigation service the method can in another embodiment also be applied to data which are in part or entirely generated by simulations or theoretical analyses.

Figure 1:
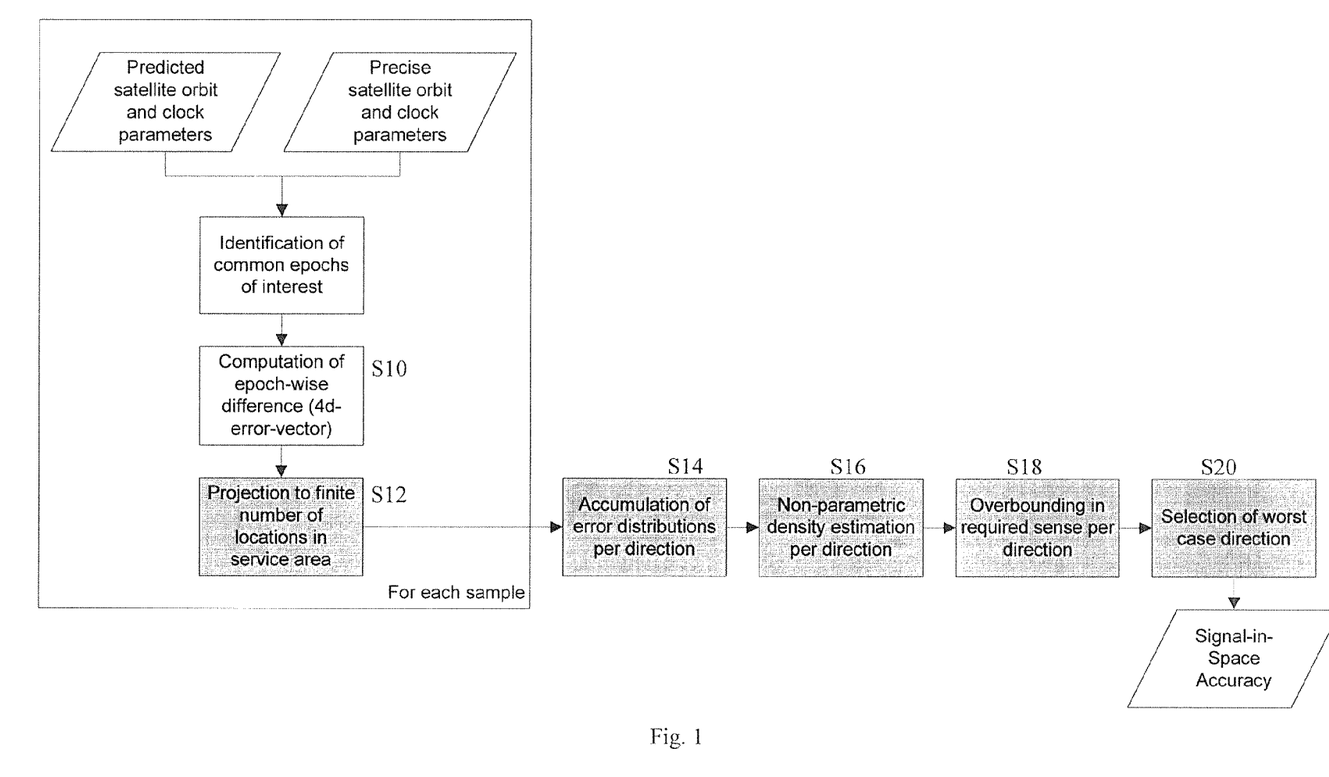
FIG. 1 illustrates a flowchart of an embodiment of a method for computing robust and improved Signal-in-Space Accuracy parameters in a Regional or Global Navigation Satellite System according to the invention.

Details to the modified SISA computation are disclosed in the following with regard to FIG. 1, which shows a flow chart of the method.

The SISA computation method comprises step S10, with which a 4 dimensional error vector is computed. Then, the method proceeds with the steps described in the following.

Step (1) determination of Signal in Space Error (step S12 in FIG. 1):

The strategy is to project the 4 dimensional error vector to a finite number of dedicated directions pointing into the service area such that this area is covered sufficiently. The number of directions is arbitrarily chosen by a trade-off between computation time and sampling density. The definition of the dedicated directions is done once and kept fixed for all computations. There are three suited reference frames identified which can be applied in different embodiments of the invention:

(1) Satellite fixed reference: this is the reference frame as seen from the navigation satellite antenna. It is fixed to the satellite.

(2) Orbit fixed reference frame 1: This frame is defined by the vector "satellite-Earth", the orthogonal projection of the "in flight direction" of the satellite perpendicular to "satellite-Earth", and the "cross flight direction" perpendicular to the former vectors.

(3) Orbit fixed reference frame 2: This frame is defined by the in flight direction, the orthogonal projection of the vector "satellite-Earth" perpendicular to the "in flight direction", and the "cross flight direction" perpendicular to the former vectors.

Step (2) Accumulation of Samples (step S14 in FIG. 1):

The single samples determined in Step (1) are accumulated per direction (and optionally per satellite if several satellites are involved). In further embodiments they can also be accumulated per dedicated conditions, e.g. eclipse condition of satellite, clock type, signal type, or satellite (build) groupings. At that stage a widening of the projected errors may be applied, in another embodiment, to account for deterministic error parts unknown to users but known to the system, leading to further robustness. It can be understood as inflation of the projected errors to cover additional deterministic error parts. The widening can be done, e.g. for paired overbounding, by the following steps:

1. Estimate the mean for each set of accumulated samples.
2. Subtract a dedicated amount, reflecting a small deterministic error, from all samples of the set which are essentially smaller than the estimated mean.
3. Add the same amount to all samples of the set which are essentially greater than the estimated mean.

This results in a bi-modal density which can be understood as the original uni-modal density whose left and right halfs are shifted apart from the centre. Widening in case of Galileo overbounding can be done similarly but without cutting the original density into two parts, using the worst information extracted by considering each shift by itself.

Step (3) Non-parametric density estimation (step S16 in FIG. 1):

Each data set built from accumulation of samples in Step (2) is now used to derive an estimation of the probability density of the corresponding underlying random variable.

There exist several methods for the non-parametric estimation of densities, among them histogram estimators. The most promising ones are based on so-called "kernel density estimators". They will be used in the following. In another embodiment the improved "adaptive kernel density estimators" can be utilised giving a better behaviour in the tails of the density estimation. These notations and the following definition can be found, e.g., in the monograph of Silverman, *Density Estimation for Statistics and Data Analysis*, Chapman and Hall, London 1986, the disclosure of which is expressly incorporated by reference herein in its entirety.

Definition of Kernel Density Estimator:

Let $X_1 \ldots X_n$ be a sample of real values of a random variable with probability density p. Let the kernel function K be a real valued, non-negative, integrable function on the real line which integrates to one. Therefore, the kernel K is itself a probability density function. Usually, but not always, K will be a symmetric function.

Then the kernel density estimator, f, with kernel K is defined by $$f(x) = \frac{1}{nh} \sum_{j=1}^{n} K\left(\frac{x - X_j}{h}\right)$$

for all real x,
where h is the window width, also called the smoothing parameter or bandwidth. It can easily be shown that f is a probability density function too. The corresponding expectation and variance can be calculated explicitly, in essential as functions of the bandwidth, the sample mean, and the expectation and variance of the kernel K Kernel Selection:

In an embodiment, well known kernels as Epanechnikov, Biweight (Quartic), Triweight, Gaussian, and Cosine kernels can be chosen, see, e.g., Silvermann, discussed above. In another embodiment, we choose as kernel K so-called cardinal B-splines of any order, e.g. 3 or 4, and re-centered to zero, which are comparable to the previous ones but having promising properties, not shared by the well known kernels: they are smooth to certain degree and zero outside a finite, simply connected interval. All mentioned kernels are Gaussian-like shaped functions. Relevant properties of the kernels are inherited by the corresponding estimators. For example, density estimators with suitable kernels are itself smooth to a certain degree. There is no choice of an origin, in contrast to histogram estimators used in prior art.

Selection of Bandwidth:

The unknown parameter h, or bandwidth, will be derived automatically via optimality criteria. Several rules exist for the data-driven (automatic) choice of an "optimal" bandwidth. Well known examples, which are used in different embodiments, are Cross-Validation based on either minimizing the integrated squared error (ISE) or the mean integrated squared error (MISE), and are plug-in methods based on minimizing the asymptotic mean integrated squared errors (AMISE), see Turlach, *Bandwidth Selection in Kernel Density Estimation: A Review*, C.O.R.E. and Institut de Statistique, Universite Catholique de Louvain, B-1348 Louvain-la-Neuve, Belgium, the disclosure of which is expressly incorporated by reference herein in its entirety. Special well known methods corresponding to the previous classes, showing good performance in this area of estimating the probability density of SISE, are the Least Squares Cross-Validation, minimising ISE
the Bandwidth Factorised Smoothed Cross-Validation, minimising MISE
the Park & Marron Plug-In, and the Sheather & Jones Plug-In, based on AMISE Step (4) Overbounding (step S18 in FIG. 1):

SISA will be calculated using the estimated density of Step (3).

The Galileo Overbounding concept reads as follows:

$$\int_{-L}^{L} q(t)dt \leq \int_{-L}^{L} p(t)dt$$

for all L>0
where $$q(t) = \frac{1}{\sqrt{2\pi} \, SISA} e^{-\frac{1}{2}\left(\frac{t}{SISA}\right)^2}$$

is the overbounding function and p is the density function to be overbounded by q.

Elementary Manipulation Leads to:

$$SISA = \frac{1}{\sqrt{2}} sup_{L>0} \frac{L}{\text{erf}^{-1}\left(\int_{-L}^{L} p(t)dt\right)}. \qquad \text{(equation 1)}$$

Now, using a suitable kernel density estimator f for the unknown probability density p, the involved integrals can be calculated exactly, i.e. without approximation by numerical quadrature. Therefore, SISA can be approximated quite well by discretising an interval [0, L__0], where L__0 is any number such that the integral $\int_{-L}^{L} p(t)dt$ is numerically one, and by searching for the corresponding maximal value of the quotient expressing SISA in equation 1. In close vicinity of L=0 the fraction in equation 1 can be approximated sufficiently by linearising the denominator resulting in canceling out L. For L=0 the right hand side of equation 1 reads as $1/(p(0)\cdot\sqrt{2\pi})$.

In another embodiment the parameters of the concept of paired overbounding with excess mass can be derived analogously.

In the following step S20, a worst case direction is selected and then the computed SISA parameter is output for further processing, particularly for broadcasting in the GNSS.

Figure 2:
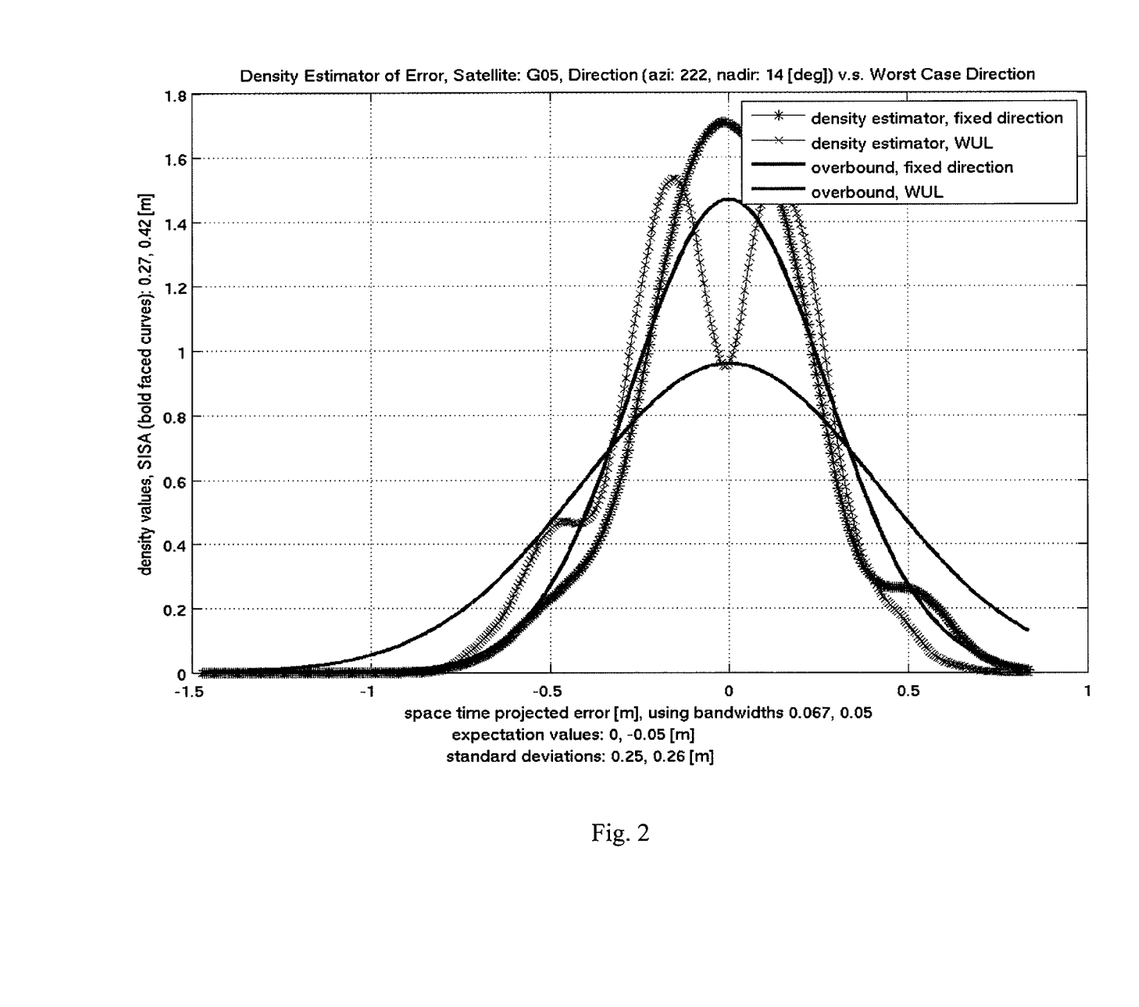
FIG. 2 is a diagram with the course of different density values, SISA over the space time projected error.

The advances of the invention with respect to prior art are the following:

Step (1) of the method leads to more realistic error distributions (uni-modal) allowing to explore respective performance margins while conservativeness can still be ensured; see FIG. 2. The performance margin which is made accessible by this can be up to 5-10%.

Step (3) is a density estimation strategy robust against singularities in the underlying distribution. Therefore Step (3) could also be applied to the bi-modal distributions generated with the classical approach; see figure FIG. 2.

Results of Step (3) are not dependent of any configuration parameters. Therefore no weakly justified assumptions are necessary. Application of different kernels and different bandwidth selectors support the statement of robustness:

Sheather & Jones Plug-In vs. Least Squares Cross-Validation: relative change in SISA essentially less than
5% in estimating densities for classical approach of prior art
2% in estimating densities for the herein proposed approach
Gaussian vs. cardinal B-spline of order 3: relative change in SISA less than
0.4% in estimating densities for classical approach of prior art
0.2% in estimating densities for the herein proposed approach Step (4) is the correct numerical application of the overbounding definition to the estimated density. This is not the case for the classical approach. Therefore the confidence of the results of the proposed strategy can be ensured.

Within Step (3) dedicated dependencies of the underlying data may be handled by nature of the bandwidth selectors while the approach of prior art applies a rule of thumb method to deal with this.

In accordance with various embodiments of the present disclosure, methods described herein can be performed as software programs running on and/or executed by a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software implementations of the subject matter described herein can be stored on a tangible storage medium, such as: a magnetic medium such as a disk or tape; a magneto-optical or optical readable medium such as, for example, a disk; or a solid state medium such as a memory card or other package that houses one or more read-only (non-volatile) memories, random access memories, or other re-writable (volatile) memories. Accordingly, the disclosure is considered to include a tangible storage medium or distribution medium, as listed herein and including art-recognized equivalents and successor media, in which the software implementations herein are stored.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for computing, via a processor, Signal-in-Space Accuracy (SISA) parameters in a regional or Global Navigation Satellite System (GNSS), the method comprising:
at least one of:
    determining individual Signal-in-Space Error (SISE) vectors by mapping the individual SISE vectors to a service area;
    accumulating sample sets;
    processing density functions of estimations of accumulated sample sets;
    individually overbounding density functions in one of an overbounding sense related to the regional or GNSS or in a paired overbounding with excess mass sense; and
    selecting a worst case according to predefined requirements.

2. A method for computing, via a processor, Signal-in-Space Accuracy (SISA) parameters in a regional or Global Navigation Satellite System (GNSS), the method comprising:
at least one of:
    determining individual Signal-in-Space Error (SISE) vectors by mapping the individual SISE vectors to a service area;
    accumulating sample sets;
    processing density functions of estimations of accumulated sample sets;
    individually overbounding density functions in one of an overbounding sense related to the regional or GNSS or in a paired overbounding with excess mass sense; and
    selecting a worst case according to predefined requirements,
wherein the mapping of the individual SISE vectors to the service area comprises:
projecting a four-dimensional individual SISE vector to a finite number of dedicated directions pointing into the service area such that the service area is covered sufficiently,
wherein the projecting utilizes a reference frame that is formed by one of:
    a satellite fixed reference, so that the reference frame is as seen from the navigation satellite antenna and which is fixed to the satellite;
    a first orbit fixed reference frame defined by a "satellite-Earth" vector, an orthogonal projection of an "in flight direction" vector of the satellite that is perpendicular to "satellite-Earth" vector, and a "cross flight direction" vector that is perpendicular to the "satellite-Earth" and "in flight direction" vectors; and
    a second orbit fixed reference frame defined by the "in flight direction" vector, an orthogonal projection of the "satellite-Earth" vector that is perpendicular to the "in flight direction" vector, and the "cross flight direction" vector that is to the "satellite-Earth" and "in flight direction" vectors.

3. A method for computing, via a processor, Signal-in-Space Accuracy (SISA) parameters in a regional or Global Navigation Satellite System (GNSS), the method comprising:
at least one of:
    determining individual Signal-in-Space Error (SISE) vectors by mapping the individual SISE vectors to a service area;
    accumulating sample sets;
    processing density functions of estimations of accumulated sample sets;
    individually overbounding density functions in one of an overbounding sense related to the regional or GNSS or in a paired overbounding with excess mass sense; and
    selecting a worst case according to predefined requirements,
wherein the accumulating of empirical sample sets comprises one of:
    accumulating per direction, or
    accumulating per dedicated conditions; and
wherein when more than one satellite is involved in the accumulating of empirical sample sets, accumulating per direction and per satellite.

4. The method of claim 3, wherein the dedicated conditions comprise eclipse condition of satellite, clock type, signal type, or satellite (build) groupings.

5. The method of claim 3, wherein the accumulating empirical sample sets further comprises, for paired overbounding with excess mass, widening of projected errors by:
    estimating a mean for each set of accumulated samples;
    subtracting a dedicated amount, reflecting a small deterministic error, from all samples of the set which are essentially smaller than the estimated mean; and
    adding a same amount to all samples of the set which are essentially greater than the estimated mean.

6. The method of claim 3, wherein the accumulating empirical sample sets further comprises, for overbounding related to the relative or GNSS, widening projected errors by:
    estimating a mean for each set of accumulated samples;
    calculating a SISA parameter for the samples of the set;
    subtracting a dedicated amount, reflecting a small deterministic error, from all samples of the set, and then calculating the SISA parameter to identify a worst case calculated SISA parameter and the calculated SISA parameter preceding the identified worst case calculated SISA parameter; and
    adding a same amount to all samples of an original set, and then calculating the SISA parameter to identify a worst case calculated SISA parameter and the calculated SISA parameter preceding the identified worst case calculated SISA parameter.

7. A method for computing, via a processor, Signal-in-Space Accuracy (SISA) parameters in a regional or Global Navigation Satellite System (GNSS), the method comprising:
at least one of:
    determining individual Signal-in-Space Error (SISE) vectors by mapping the individual SISE vectors to a service area;
    accumulating sample sets;
    processing density functions of estimations of accumulated sample sets;

individually overbounding density functions in one of an overbounding sense related to the regional or GNSS or in a paired overbounding with excess mass sense; and selecting a worst case according to predefined requirements, wherein the processing density functions of estimations of accumulated sample sets comprises deriving an estimation of the probability density of a corresponding underlying random variable by applying one of a kernel density estimator or an adaptive kernel density estimator method.

8. The method of claim 7, wherein a kernel k is selected from the group consisting of Epanechnikov, Biweight (Quartic), Triweight, Gaussian, and Cosine kernels.

9. The method of claim 7, wherein a kernel k is selected from the group consisting of cardinal B-splines of any order and re-centered to zero.

10. The method of claim 9, wherein the cardinal B-splines have an order of one of 3 or 4.

11. The method of claim 7, wherein a bandwidth h is derived automatically via optimality criteria selected from the group consisting of:

a cross-validation based on minimizing the integrated squared error (ISE); a mean integrated squared error (MISE), or plug-in methods based on minimizing the asymptotic mean integrated squared errors (AMISE);

a least squares cross-validation that includes minimizing ISE;

a bandwidth factorized smoothed cross-validation that includes minimizing MISE; and at least one of a Park & Marron Plug-In and the Sheather & Jones Plug-In, which are based on AMISE.

12. The method of claim 11, wherein the individually overbounding in the overbounding sense related to the regional or GNSS comprises approximating a SISA parameter using the equation:

$$SISA = \frac{1}{\sqrt{2}} sup_{L>0} \frac{L}{\mathrm{erf}^{-1}\left(\int_{-L}^{L} p(t)dt\right)}, \quad (1)$$

wherein f is a kernel density estimator for the unknown probability density p, and an interval [0, L_0] is discretized, where L_0 is any number such that the integral $\int_{-L}^{L} p(t)dt$ is numerically one, and wherein a corresponding maximal value of the quotient expressing SISA in equation (1) is sought.

13. A computer program stored on a non-transitory, tangible storage medium that stores a set of code that is executable by a processor to direct the processor to perform a method for computing Signal-in-Space Accuracy (SISA) parameters in a regional or Global Navigation Satellite System (GNSS), the computer program comprising:

code executable to determine individual Signal-in-Space Error (SISE) vectors;

code executable to map the individual SISE vectors to a service area;

code executable to accumulate empirical sample sets;

code executable to process density functions of estimations of the accumulated sample sets;

code executable to individually overbound density functions in one of an overbounding sense related to the regional or GNSS or in a paired overbounding with excess mass sense; and code executable to select a worst case according to predefined requirements.

14. A non-transitory, tangible storage medium comprising the computer program of claim 13.

15. An apparatus for computing Signal-in-Space Accuracy (SISA) parameters for a navigation system, comprising:

a navigation system comprising a navigation signal generator;

an individual Signal-in-Space Error (SISE) vector determiner associated with the navigation signal generator;

a service area mapper associated with the navigation signal generator configured to map the individual SISE vectors;

empirical sample sets accumulator for each clock/position signal generator in the navigation system;

a calculator structured to calculate density functions of estimations of the accumulated sample sets;

a device structured to individually overbound density functions in one of an overbounding sense related to the navigation system or in a paired overbounding with excess mass sense; and a worst case selector structured to identify and select a worst case condition based upon predefined requirements.

16. The apparatus of claim 15, wherein the navigation system comprises a regional or Global Navigation Satellite System (GNSS).

17. The apparatus of claim 15, wherein the navigation system is not a satellite-based system.

18. The apparatus of claim 15, wherein the navigation signals comprise at least one of position and clock data.

19. A method for computing, via a processor, Signal-in-Space Accuracy (SISA) parameters in a regional or Global Navigation Satellite System (GNSS) comprising:

determining individual Signal-in-Space Error (SISE) vectors;

mapping the individual SISE vectors to a service area;

accumulating empirical sample set according to a direction;

processing density functions of estimations of the accumulated empirical sample sets;

individually overbounding density functions in one of an overbounding sense related to the regional or GNSS or in a paired overbounding with excess mass sense; and selecting a worst case direction.

20. The method of claim 19, further comprising broadcasting the SISA parameter in the regional or GNSS.

* * * * *